Patented Aug. 22, 1939

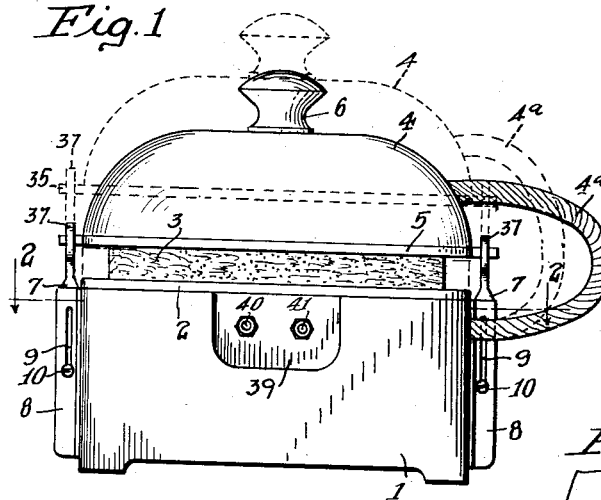

2,170,070

UNITED STATES PATENT OFFICE 2,170,070

AUTOMATIC TOASTER

Bert R. Deleray, Los Angeles, Calif.

Application April 28, 1937, Serial No. 139,444

10 Claims. (Cl. 219—19)

This invention relates to an electric toaster, and the general object of the invention is to produce a toaster of simple construction provided with automatic means for arresting the toasting operation after the lapse of a predetermind time sufficient to make the toast.

One of the objects of the invention is to provide means for holding the bread slice between two heating elements, and for automatically moving one of the heating elements away from the other after the lapse of the toasting time; and to provide automatic means for ejecting the toast thereafter.

A further object of the invention is to provide a toaster with an ejector operating automatically to eject the toast and to provide means controlled by the movement of the ejector in placing the bread in the toaster, for automatically closing a switch in the electric circuit.

A further object of the invention is to provide a toaster with simple heat-sensitive means cooperating with simple means controlled by the heat-sensitive member for arresting the toasting operation, and for automatically opening the circuit.

In the embodiment of the invention described in the following specification, the toaster includes a base carrying a heating plate and a movable cover, also carrying a heating plate which lies upon a slice of bread. A toaster embodying a cover seating on the bread in this way, as usually constructed, involves the use of a lever or levers for supporting the cover and permitting the same to swing down onto the bread. It is difficult in such a construction to regulate the pressure of the cover against the bread. One of the objects of the present invention is to produce a toaster of this type involving the use of a movable cover in which it is unnecessary to employ a hinge connection between the cover and the body of the toaster, but in which the cover presses lightly on the bread.

A further object of the invention is to construct a toaster of this movable cover type, in which the cover will be latched in a depressed position, resting on the bread, and to provide automatic means for releasing the latching means to permit the counterbalancing means to raise the cover from the toast at the expiration of the toasting time; also, to provide a toaster of this type with an ejector for ejecting the toast after the cover is raised, and to connect the ejector to the releasing means and latching means in such a way that after the cover is raised, the ejector will eject the toast and automatically open the switch through which the current flows that passes through the heating elements.

A further object of the invention is to improve the general construction of toasters of the loose cover type.

Further objects of the invention will appear hereinafter.

The invention consists in the novel parts and combination of parts to be described hereinafter, all of which contribute to produce an efficient automatic toaster.

A preferred embodiment of the invention is described in the following specification, while the broad scope of the invention is pointed out in the appended claims.

In the drawing:

Fig. 1 is a front elevation of a toaster embodying my invention, and illustrating a cover in a raised position in dotted lines.

Fig. 2 is a horizontal section taken on the line 2—2 of Fig. 1, upon a slightly reduced scale, and particularly illustrating the ejector and means for guiding the supports for the cover.

Fig. 3 is a horizontal section taken about on the line 3—3 of Fig. 4, but with the cover raised, certain parts being broken away.

Fig. 4 is a section taken about on the line 4—4 of Fig. 3 upon an enlarged scale, with parts broken away, and showing further details of the construction.

Fig. 5 is a fragmentary side elevation with parts broken away, and illustrating the preferred construction of the connection between the supporting means for the cover and the cover itself.

Fig. 6 is a fragmentary vertical section taken on the line 6—6 of Fig. 3, and particularly illustrating details of the latching means, the switch, and means for controlling the same.

The toaster illustrated includes a body 1 carrying a relatively fixed toasting plate, or heating plate 2 at its upper side, on which the bread 3 rests in being toasted. On the bread the cover 4 of the toaster rests, said cover being provided with a toasting plate, or heating plate 5 on its under side, that is in contact with the bread. The cover may be provided with a knob 6 for raising or lowering the same.

On opposite sides of the cover I provide means for guiding the same on the body, and associated with this guiding means I provide resilient means for counterweighting the weight of the cover. For this purpose I prefer to provide the sides of the cover with guide posts 7, which extend downwardly upon the same, and are mounted to move up and down in housings or guides 8 formed at each side of the body 1. These parts are located substantially on a medial axis of the cover and respectively on opposite sides of the cover. The guides 8 are preferably provided with slots 9 respectively, to receive screws 10 that pass through the slots and into the posts 7 to limit the up and down movement of the posts. The resilient means for raising the cover preferably consists of a coil spring 8a mounted in each of the guides 8 (see Fig. 4), which springs thrust against the under sides of the posts.

When the bread 3 has been placed in the toaster, the cover 4, of course, will be in its raised position such as that indicated by the dotted lines in Fig. 1. The cover is then pressed downwardly to a variable level depending upon the thickness of the slice of bread, and when this is done a rack 11 formed on each post, cooperates with a corresponding detent pawl 12 so that these detent pawls will engage the rack teeth (see Fig. 6) to hold the cover in its depressed position and substantially in contact with the bread.

The toaster is provided with automatic means to release the pawls after the lapse of the toasting time. For this purpose the pawls are preferably rigidly carried on a transverse shaft 13, and this shaft is substantially parallel with the plane of the fixed plate 2, and provided with a rigid arm 14 that lies adjacent to a heat-sensitive member that is adapted to change its shape and move the arm 14 in a direction to rotate the shaft 13 in a clockwise direction as viewed in Fig. 6, to release the pawls. In the present instance, the heat-sensitive member consists of a bimetal bar 15 composed of two metal strips 15a and 15b having different coefficients of expansion. This bar is preferably in the form of a flat bar with its flat side toward the fixed plate, and mounted at one end on an insulating block 16 that insulates it thermally from the plate 2, to the under side of which it is attached. The upper strip 15a has the greatest coefficient of expansion so that when the bar 15 is heated by radiation from the plate 2, it will become distorted and its end will bend downwardly so as to engage the arm 14 and release the pawls.

The bar 15 is preferably provided with regulating means for controlling its position for adjusting its action from the heat. For this purpose I may provide a sliding sleeve 17 on the bar near its point of attachment to the block 16. The bar 15 should have a slight natural curvature adjacent the block 16, so that when the sleeve 17 slides out on the bar in a direction away from the block, it will tend to adjust the bar 15 toward the plate 2.

This control by the heat-sensitive member 15 is preferably utilized to open a switch through which the current passes in passing through the heating elements 18 and 19 that are secured respectively on the under side of the plate 2 and on the upper side of the plate 5. These heating elements are connected into the heating circuit by a flexible electric cord 4a that is connected through the cover and through the side of the body 1 (see Fig. 1).

Any suitable switch device may be employed, preferably controlled by the rotation of the shaft 13. In the present instance, I have illustrated a switch mounted to rock on an axis substantially parallel with the plane of the fixed plate, and I prefer to use a mercury tube 20 for this purpose, secured on an arm 21 that extends radially from the shaft 13 and located toward one side of the toaster, as illustrated in Fig. 3. This mercury tube 20 is of common construction, being preferably formed of glass with two terminals 22 projecting into its outer end and connected to light insulated wires 23. In the position in which this mercury tube 20 is shown in Fig. 6, the terminals 22 are, of course, bridged by the mercury so as to close the heating circuit. When the bar 15 has moved the arm 14 down, the mercury tube 20 will be in an elevated position so that the mercury is out of contact with the terminals 22 which, of course, opens the circuit.

It should be understood that as soon as the pawls 12 are released through the action of the thermostat, or heat-sensitive member 15, the springs 8a will move the cover up to its raised position as indicated in dotted lines in Fig. 1. The toaster is preferably provided with an automatic ejector 24 for ejecting the toast when the cover is raised by the springs. This ejector is shown clearly in Figs. 2 and 4. It is preferably in the form of an angularly bent bar having a radial extension 25 and a lateral extension 26 forming an angle and extending along the adjacent sides of the toaster. The radial arm 25 of this ejector 24 is preferably attached to a stub shaft 27 that passes down through the plate 2 at one side, and in the vertical plane above the shaft 13. This shaft 27 is connected to the shaft 13 so that they will move in unison but at different angular velocities. For this purpose the stub shaft 27 is provided with a bevel pinion 28 that meshes with the bevel gear 29 on the shaft 13, and these bevel gears are so proportioned that when the ejector is pushed back by the bread into the position in which it is illustrated in Fig. 2, the shaft 13 will be rotated so as to swing the arm 21 downwardly and thereby depress the terminal end of the tube 20 and close the circuit.

The switch tube 20 is held yieldingly in either its closed or open position, and for this purpose I prefer to provide the shaft 13 with a crank arm 32 to which a coil spring 33 attaches (see Figs. 3 and 6). This coil spring is anchored at 34 at the same level as the shaft 31, so that when the shaft 13 is rotated to latch the cover down by means of the pawls 12, the crank 32 will be below its horizontal dead center. Likewise when the switch is in its "off" position and the tube 20 is elevated, the crank 32 will be rotated above the horizontal dead center, and the coil spring 33 will hold it yieldingly in this position.

The connection between the cover 4 and the guide posts 7 is a "wobbly" connection, that is to say, a loose one, or what is commonly called a "sloppy" fit. This enables the cover to tilt somewhat and accommodate its position to the face of the slice of bread 3. For this purpose the cover is provided with a pair of outwardly projecting tongues 35 located at diametrically opposite points on the cover to correspond with the posts. These tongues 35 are preferably of horizontally elongated form, and are received loosely in corresponding rectangular openings 36 formed in the heads 37 of the posts.

The toaster is preferably provided with a thermostatic circuit opener 38 (see Fig. 3) that is connected into the heating circuit, and which operates to open the circuit if the lower plate becomes too highly heated.

Any suitable wiring arrangement may be adopted. In the present instance, the casing of the body 1 is provided with the usual socket 39 through which a socket terminal for an electric cord may be inserted to connect the circuit conductors to the two terminals 40 and 41. The terminal 40 may be connected by a conductor 42 to one of the small wires 23 of the switch tube 20. The current from the tube 20 may pass by a conductor 43 to the aforesaid thermostatic regulator 38, and thence by a wire 44 up to the upper heating element 19. From the upper heating element 19 the circuit returns by wire 45 which passes back into the body and connects to a terminal 46 of the lower heating element 18. After passing through the heating element, the circuit includes a wire 47 that connects the other terminal of the heating element to the terminal 41.

The mode of operation of the toaster will now be briefly described.

When the cover 4 is in its elevated position as illustrated in dotted lines in Fig. 1, the spring 33 will hold the ejector 24 in some such position as that indicated in dotted lines in Fig. 2. When the bread 3 is shoved into position, the ejector 24 will be rotated back to the position in which it is shown in full lines in Fig. 2. This movement, through the medium of the bevel gears 28 and 29 will rotate the shaft 13 in a direction to close the switch at the tube 20 and also swing the pawls 12 in against the teeth of the racks 11. It will also swing crank 32 above its dead center enabling the spring 33 to hold the crank there. The operator then pushes down the cover 4 at the knob 6 until the cover engages the bread firmly. This will compress the springs 8ª, and the pawls 12 will latch the racks down. The parts are all now set for toasting the bread. When the toasting time has elapsed, the heat-sensitive bar 15 will become bowed by the heat, and will have swung down at its free end, so as to commence the releasing movement by starting the rotation of the pawl shaft 13 to bring the crank 32 above its dead center and enable this spring to snap the crank 32 to its extreme upper position, thereby rotating the shaft 13 and completing the release of the pawls; in practice, only a very slight movement will be required to effect this release of the pawls, and when this occurs the springs 8ª will immediately move the cover 4 to its elevated position, whereupon the spring 30 will actuate the ejector to eject the toast. The ejector arm is preferably resilient to permit the unlatching movement for the pawls to occur in spite of the fact that the toast is held fixed between the heating plates.

Or, if desired, in order to permit this slight movement that the crank 32 must take when the shaft 13 is moved by the heat-sensitive member 15, without moving the toast the teeth of the bevel gears may permit some lost motion between them. The teeth of the racks 11 are, of course, inclined in the manner indicated in Fig. 6, and the shoulders or abrupt faces of these teeth that engage the end of the pawl preferably are substantially at right angles to a line joining them to the axis of the shaft 13. This enables the pawls to free themselves very readily and without the exertion of much force by the bar 15. If desired, the toaster can be made of double width so as to toast two pieces of toast simultaneously.

It is understood that the embodiment of the invention described herein is only one of the many embodiments this invention may take, and I do not wish to be limited in the practice of the invention, nor in the claims, to the particular embodiment set forth.

What I claim is:

1. In a toaster for bread or the like, the combination of a relatively fixed heating plate, a movable heating plate, a pair of posts having loose connections, respectively connecting the same to the movable heating plate, a housing having guideways for guiding the posts to enable the movable heating plate to move toward or away from the relatively fixed plate, to press against the bread between the plates, said posts located substantially on a medial axial line of the movable heating plate and on opposite sides of the same respectively, springs mounted in the guideways of said housing under said posts for counter-balancing the pressure of the relatively movable plate against the bread, latching means for latching the relatively movable plate pressed against the bread, automatic means for releasing the latching means after the expiration of sufficient time to permit the bread to be toasted, to permit the said springs to move the relatively movable plate away from the bread, and resilient means held in a constrained position by the bread when held between said plates, for ejecting the bread after the movable plate has been moved away from the relatively fixed plate.

2. In a toaster, the combination of a relatively fixed heating plate, a movable heated cover plate, means for guiding the cover plate to slide toward or from the relatively fixed plate to press the bread against the same, resilient means for counterbalancing the weight of the relatively movable plate against the bread, latching means for latching the relatively movable plate against the bread, heating elements associated with the said plates for heating the same, means for establishing an electric circuit through the heating elements including a switch, and a fixed bi-metallic flat heat-sensitive bar mounted so that it is exposed to the radiant heat from the side of the fixed heating plate remote from the bread for moving the switch to open the same and the latching means to release the same after the expiration of sufficient time to permit the bread to be toasted, to permit the said resilient means to move the relatively movable plate away from the bread.

3. In a toaster, the combination of a relatively fixed heating plate, a movable heated cover plate, means for guiding the cover plate to slide toward or from the relatively fixed plate to press the bread against the same, resilient means for counterbalancing the weight of the relatively movable plate against the bread, latching means for latching the relatively movable plate against the bread, heating elements associated with the said plates for heating the same, means for establishing an electric circuit through the heating elements including a switch, automatic means for opening the switch and releasing the latching means after the expiration of sufficient time to permit the bread to be toasted, to permit the said resilient means to move the relatively movable plate away from the bread, an ejector for the bread in the path of the bread when the same is inserted between the heating plates, and means connecting the ejector with the switch for closing the switch automatically when the bread is put in place between the heating plates.

4. In a toaster for bread or the like, the combination of a relatively fixed heating plate, a movable heating plate, means for guiding the same to slide toward or from the relatively fixed plate to press against the bread, resilient means for counterbalancing the pressure of the relatively movable plate against the bread, latching means for latching the relatively movable plate pressed against the bread, a heat-sensitive bi-metallic flat bar mounted adjacent the rear face of the relatively fixed heating plate so as to be heated by direct radiation from the same, said heat-sensitive element constructed so that it changes its shape and undergoes a bowing movement as it becomes hot; and means actuated by the said bowing movement for releasing the latching means, said resilient means operating when the latching means is released, to move the movable plate away from the fixed heating plate.

5. In a toaster for bread or the like, the combination of a relatively fixed heating plate, a movable heated cover plate, a pair of posts carried by the cover plate for supporting the same means for guiding the posts and the cover plate to slide toward or from the relatively fixed plate to press the bread against the same, said posts located substantially on a medial axis of the cover plate and respectively on opposite sides of the same, a rack at each side of the cover plate and carried by the posts, detent pawls cooperating with the racks to latch the cover pressed against the bread, springs cooperating with the cover and mounted so as to be compressed when the cover is pressed down on the fixed heating plate, and means actuated after the lapse of the toasting time for releasing the detent pawls from the racks, thereby permitting the springs to raise the cover from the bread.

6. In a toaster for bread or the like, the combination of a relatively fixed heating plate, a movable heated cover plate, means for guiding the cover plate to slide toward or from the relatively fixed plate to press the bread against the same, a rack connected directly to each side of the cover plate so as to move up and down with the same, detent pawls cooperating with the racks to latch the cover pressed against the bread, springs corresponding to the racks, respectively, cooperating with the cover and mounted so as to be compressed when the cover is pressed down on the fixed heating plate, a heat-sensitive bi-metallic member adapted to change its shape and become bowed under the action of the heat, and means actuated by the bowing movement for releasing the detent pawls from the racks.

7. In a toaster for bread or the like, the combination of a relatively fixed heating plate, a movable heating plate, means for guiding the same to slide toward or from the relatively fixed plate for toasting the bread, a pair of racks carried by the movable plate and disposed at opposite sides of the movable plate, resilient means mounted so as to be constrained when the movable plate is moved toward the fixed plate, detent pawls cooperating with the racks respectively to hold the movable plate against outward movement under the action of the resilient means, a heat-sensitive means for moving the pawls to initiate their releasing movement, and resilient means for completing the releasing movement of the pawls.

8. In a toaster for bread or the like, the combination of a relative fixed heating plate, a movable heated cover plate, means for guiding the cover plate to slide toward or from the relatively fixed plate to press the bread against the same, a rack at each side of the cover plate and connected with the same, detent pawls cooperating with the racks to latch the cover pressed against the bread, springs cooperating with the cover and mounted so as to be compressed when the cover is pressed down on the fixed heating plate, a shaft carrying the said detent pawls, a dead center-crank and spring attached to the same, heat-sensitive means for commencing the rotation of the said shaft after the lapse of the toasting time to effect the release of the pawls from the racks through the agency of the last-named spring, and switch means connected with the shaft so as to be opened when the shaft is rotated to release the pawls.

9. In a toaster for bread or the like, the combination of a relatively fixed heating plate, a movable heated cover plate, means for guiding the cover plate to slide toward or from the relatively fixed plate to press the bread against the same, a rack at each side of the cover plate and connected with the same, detent pawls cooperating with the racks to latch the cover pressed against the bread, springs cooperating with the cover and mounted so as to be compressed when the cover is pressed down on the fixed heating plate, a shaft carrying the said detent pawls, means for rotating the said shaft after the lapse of the toasting time to release the pawls from the racks, and switch means connected with the shaft so as to be opened when the shaft is rotated to release the pawls, said resilient means operating to move the movable plate away from the fixed plate when the pawls are released, and a spring-actuated ejector for ejecting the toast from between the plates when the movable plate is moved away from the fixed plate.

10. In a toaster for bread or the like, the combination of a relatively fixed heating plate, a movable heated cover plate, means for guiding the cover plate to slide toward or from the relatively fixed plate to press the bread against the same, a rack at each side of the cover plate and connected with the same, detent pawls cooperating with the racks to latch the cover pressed against the bread, springs cooperating wih the cover and mounted so as to be compressed when the cover is pressed down on the fixed heating plate, a shaft carrying the said detent pawls, means for rotating the said shaft after the lapse of the toasting time to release the pawls from the racks, and switch means connected with the shaft so as to be opened when the shaft is rotated to release the pawls, said resilient means operating to move the movable plate away from the fixed plate when the pawls are released, a spring-actuated ejector for ejecting the toast from between the plates when the movable plate is moved away from the fixed plate, and means connecting the ejector with the said shaft and enabling the movement of the ejector by the bread when being put into position for toasting, to rotate the pawl shaft and close the said switch.

BERT R. DELERAY.